(12) United States Patent
Blanke et al.

(10) Patent No.: US 7,859,427 B2
(45) Date of Patent: Dec. 28, 2010

(54) BIDIRECTIONAL, DC-ISOLATED TRANSMISSION CHANNEL

(75) Inventors: Joerg Blanke, Lemgo (DE);
Heinz-Wilhelm Meier, Kalletal (DE)

(73) Assignee: Phoenix Contact GmbH & Co. KG (DE)

( * ) Notice: Subject to any disclaimer, the term of this patent is extended or adjusted under 35 U.S.C. 154(b) by 213 days.

(21) Appl. No.: 12/280,118

(22) PCT Filed: Feb. 26, 2007

(86) PCT No.: PCT/EP2007/001640
§ 371 (c)(1),
(2), (4) Date: Jan. 13, 2009

(87) PCT Pub. No.: WO2007/098909
PCT Pub. Date: Sep. 7, 2007

(65) Prior Publication Data
US 2009/0243765 A1 Oct. 1, 2009

(30) Foreign Application Priority Data
Feb. 27, 2006 (DE) .................... 10 2006 009 506

(51) Int. Cl.
*G08C 19/16* (2006.01)
*H02J 5/00* (2006.01)
(52) U.S. Cl. .................... 340/870.31; 340/870.39; 307/22; 363/15
(58) Field of Classification Search ............... 363/15, 363/16, 17, 18, 19, 20, 21.01; 307/2, 5, 6, 307/7, 11, 17, 31, 32, 33, 34; 340/870.31, 340/870.39
See application file for complete search history.

(56) References Cited

U.S. PATENT DOCUMENTS

| | | | | |
|---|---|---|---|---|
| 4,792,965 A | * | 12/1988 | Morgan | 375/218 |
| 5,325,046 A | * | 6/1994 | Young et al. | 323/356 |
| 5,801,644 A | * | 9/1998 | Ruthroff | 340/870.31 |
| 5,907,292 A | * | 5/1999 | Ahr | 340/870.31 |
| 7,369,420 B2 | * | 5/2008 | Cebry | 363/97 |

FOREIGN PATENT DOCUMENTS

| | | |
|---|---|---|
| DE | 34 07 324 A1 | 8/1985 |
| DE | 35 33 278 A1 | 3/1987 |
| DE | 44 21 837 A1 | 1/1996 |
| DE | 102 17 447 A1 | 11/2003 |
| WO | 91/13417 A | 9/1991 |

OTHER PUBLICATIONS

Cussac, Yolaine, "International Application No. PCT/EP2007/001640 International Preliminary Report on Patentability", Nov. 20, 2008, Publisher: PCT, Published in: EP.
International Search Report and Written Opinion, Dated Jun. 15, 2007, Published by the European Patent Office.

* cited by examiner

*Primary Examiner*—Dean O Takaoka
(74) *Attorney, Agent, or Firm*—DeMont & Breyer, LLC

(57) ABSTRACT

Arrangement and method for electrically isolated transmission of direct-current and alternating-current signals. The signals can be transmitted in both directions via the same and only DC-isolated channel. The arrangement comprises a first transmit-and-receive system (1), a direct-current transmitter (4) in short-circuit mode, an operational amplifier arrangement (5), and a second transmit-and-receive system (2) with a message signal transmitter (9).

18 Claims, 10 Drawing Sheets

BIDIRECTIONAL, DC-ISOLATED TRANSMISSION CHANNEL

FIELD OF THE INVENTION

The invention relates to an arrangement and to a method for the electrically isolated transmission of direct-current and alternating-current signals as measurement signals and as message signals between two transmit-and-receive systems.

BACKGROUND OF THE INVENTION

Such an arrangement is described, e.g., in DE 297 18 405 U1, DE 298 16 659 U1, and EP 0 658 866 B1. In these documents, methods are disclosed in which the measurement signal is transmitted in a first channel, and the message signal is transmitted in a second channel. The first channel comprises a coupling stage, and the second channel comprises a transmitter or another coupling stage. Thus, overall two DC-isolated channels are required. The use of two DC-isolated channels, however, is cost intensive and has high spatial requirements.

In a signal feed isolator for measurement signals (DE 103 22 262 A1), only one two-conductor channel is required for the transmission of the signals, in which a voltage converter is used for the DC isolation in the transmission path, but an auxiliary power supply circuit is needed to prepare the received voltage signals according to the actual power requirements. With this circuit, however, no transmit-and-receive systems are connected to active current outputs because the energy is made available by the supply circuit, and thus, two voltage sources would work against each other.

A circuit arrangement for potential-free signal transmission between two electronic units by means of a transformer is also known (DE 35 33 278 C2), in which the secondary winding of the transformer is short-circuited for the presence of a return message signal. However, the control signal and return message signal must be performed one after the other, i.e., the simultaneous transmission of a current signal from one unit and a voltage signal from the other unit is not possible by means of a single two-conductor channel.

GENERAL DESCRIPTION OF THE INVENTION

The invention is based on the problem of creating a bidirectional, DC-isolated transmission channel, which allows the simultaneous transmission of signals starting from both transmit-and-receive systems by means of channel sections each with two conductors.

The problem is solved with an arrangement for potential-controlled transmission of direct-current and alternating-current signals between a first transmit-and-receive system and a second transmit-and-receive system, which has the following features: sections of transmit-and-receive conductor pairs, which connect the two transmit-and-receive systems by means of a single two-conductor channel; a direct-current transmitter including an isolating converter with a primary circuit and a secondary circuit, which is short-circuited for signal transmission with direct-current signals, wherein the direct-current transmitter converts direct-current signals into alternating-current signals and back into direct-current signals with DC isolation of the conductor sections; an electronic I/I or I/U converter, on whose input side the signals transmitted via the channel are applied and usable signals are output on its output side as current or voltage signals to the second transmit-and-receive system; and a message signal transmitter, which is connected on the secondary side to the direct-current transmitter for the transmission of the message signal, so that, on the primary side, a change in voltage can be determined, which can be evaluated by the first transmit-and-receive system as the transmitted message signal.

The problem is also solved with a method for electrically isolated transmission of direct-current and alternating-current signals between a first transmit-and-receive system and a second transmit-and-receive system, which comprises the following steps:

in the first transmit-and-receive system, measurement signals are obtained, which are prepared for transmission via a two-conductor channel that has sections that are DC-isolated from each other; the direct-current and alternating-current signals are fed via the two-conductor channel to an electronic I/I or I/U converter by using a direct-current transmitter with an isolating converter; the electronic I/I or I/U converter recovers a current or voltage signal corresponding to the measurement signal from the direct-current and alternating-current signals and makes it available to the second transmit-and-receive system; in the case of the transmission of a message signal to the first transmit-and-receive system from the second transmit-and-receive system, the message signal is fed to the secondary circuit of the direct-current transmitter and fed to the first transmit-and-receive system via the primary circuit.

For the arrangement according to the invention, by means of the same DC-isolated channel, an advantageously direct-current signal is transmitted as a measurement signal and a direct-current voltage/alternating-current voltage return signal is transmitted as a message signal. Here, between two electronic devices there is a direct-current transmitter with an isolating converter and an electronic I/I converter or I/U converter. The two electronic devices, the direct-current transmitter, and the I/I or I/U converter are connected in series by means of sections of two-wire conductors. The isolating converter is used for the DC isolation of the current circuits of the two end devices. The direct-current transmitter is short-circuited for one signal direction, so that essentially no power is transmitted.

On the primary side of the direct-current transmitter, the advantageously direct-current signal coming from the first end device is converted into an alternating-current signal. On the secondary side, the alternating-current signal appearing there is again connected into a direct-current signal.

For the circuit-related realization of the direct-current transmitter, there are several possibilities. First, the direct-current transmitter can be formed as a half-bridge current converter with active switches (transistors, analog switches, etc.), which can also be replaced on the secondary side with diodes. Second, the direct-current transmitter can be realized as a full-bridge current converter. It is also possible to construct the direct-current transmitter with an isolating converter with center tap.

To guarantee that the direct-current transmitter is short-circuited, an I/I converter is used on its secondary side, which decouples the direct-current transmitter from the second end device.

If the second end device is to output a return signal to the first end device, then this can be fed as a pulse, direct-current voltage, or alternating-current voltage signal at various positions on the secondary side of the direct-current transmitter.

A first possibility for supplying the return signal consists in using a controlled voltage source connected in series with the secondary side of the direct-current transmitter. Furthermore, the return signal can be applied to an input of the I/I or I/U converter.

The feeding of this pulse, direct-current voltage, or alternating-current voltage signal leads to a cancellation of the short circuit of the secondary side of the direct-current transmitter, which leads to the result that the advantageously direct-current signal transmitted from the first electronic device can be driven, furthermore, only when, on the primary side, the voltage is increased by the value of the secondary-side fed pulse, direct-current voltage, or alternating-current voltage signal. In this way, on the primary side, the secondary-side fed pulse, direct-current voltage, or alternating-current voltage signal can be measured and evaluated as a return signal.

As a result, a second DC-isolated transmission channel is not needed to transmit a return signal against the direction of the advantageously direct-current signal.

The main fields of use for such an arrangement are as isolating amplifiers with HART communications in areas that are subject to and not subject to explosion hazards. For the electronic devices used in an area subject to explosion hazards, it can involve, for example, devices for measuring pressure and/or temperature values or an actuator, e.g., a valve. For the electronic device used in an area not subject to explosion hazards, it can involve, for example, a control room for monitoring the values measured "in the field."

It is further conceivable to use the arrangement according to the invention for the feedback of message and status signals, e.g., "break in wire," "short circuit," etc.

BRIEF DESCRIPTION OF THE FIGURES

For bettering understanding of the present invention, the enclosed drawings will be referenced.

Shown are.

DETAILED DESCRIPTION

Figure 1:
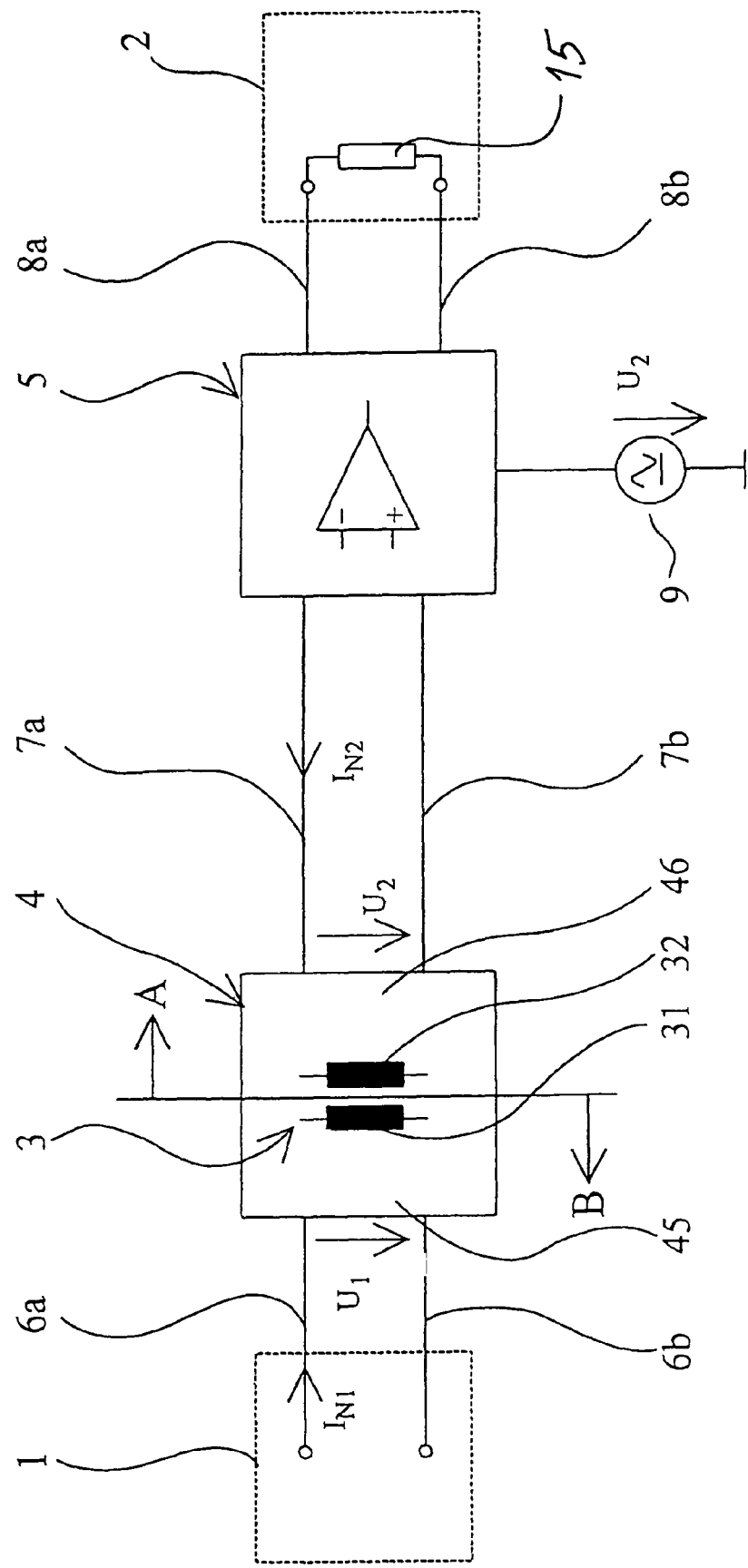
FIG. 1 a schematic representation in a block circuit diagram of the principle configuration of the arrangement according to the invention, FIG. 2 in a block circuit diagram with respect to the coupling of the message signals, the configuration of a first embodiment of the arrangement according to the invention, FIG. 3 in a block circuit diagram with respect to the coupling of the message signals, the configuration of a second embodiment of the arrangement according to the invention, FIG. 4 the circuit configuration of an embodiment of the arrangement according to the invention from FIG. 3, FIG. 5 the circuit configuration of an embodiment of the arrangement according to the invention from FIG. 2, FIG. 6 in a circuit diagram, the arrangement according to the invention from FIG. 2 with an example half-bridge current converter, FIG. 7 in a circuit diagram, the arrangement according to the invention from FIG. 3 with an example half-bridge current converter, FIG. 8 in a circuit diagram, the arrangement according to the invention with a full-bridge current converter, FIG. 9 in a circuit diagram, the arrangement according to the invention with a transmitter with center tapping as a current converter, and FIG. 10 in a circuit diagram, the arrangement according to the invention from FIG. 3 with another example half-bridge current converter.

FIG. 1 shows, in a circuit diagram, the principle configuration of the arrangement according to the invention. A first transmit-and-receive system 1 is connected via a single two-conductor channel, which comprises conductor sections 6$a$, 6$b$ or 7$a$, 7$b$ or 8$a$, 8$b$, to an isolating transformer or isolating converter 3, which is part of a direct-current transmitter 4. This is connected, in turn, via an electronic I/I or I/U converter 5 to a second transmit-and-receive system 2. The isolating converter 3 has a primary-side winding 31 and a secondary-side winding 32. These primary-side and secondary-side windings 31 and 32 define a primary side 45 (=primary circuit) and a secondary side 46 (=secondary circuit) of the direct-current transmitter 4. In the primary side 45 of the direct-current transmitter 4, applied analog direct-current signals are chopped, the chopped signals are transmitted by means of the isolating converter 3 to the secondary side 46, and converted back into analog direct-current signals from this side. More details on this process will be explained with reference to FIGS. 6 to 10.

With the primary side 45 and the secondary side 46, two regions A and B can be distinguished for the entire arrangement between the first and second transmit-and-receive systems, wherein these regions represent areas that are subject to and not subject to explosion hazards. Because there is no conductive connection between the primary side 45 and secondary side 46, the two sides are DC-isolated from each other.

The secondary side 46 of the direct-current transmitter 4 is connected via the second section of the two-conductor channel, i.e., via the connection conductor pair 7$a$ and 7$b$, to the input side of the electronic I/I or I/U converter 5. The output side of the electronic I/I or I/U converter 5 is connected by means of the third section of the two-conductor channel, which contains an output conductor pair 8$a$ and 8$b$, to the second transmit-and-receive system 2. Furthermore, a message signal transmitter 9 is connected to the electronic I/I or I/U converter 5. The message signal transmitter 9 can output both direct-current voltage signals and also alternating-current voltage signals. To report, e.g., switch states of a switch, direct-current voltage signals of different potentials (e.g., 0 V and 0.5 V) can be generated. As the alternating-current voltage signals, FSK signals (Frequency Shift Keying) can be used, for example, those according to the HART protocol.

The first transmit-and-receive system 1 leads the primary current signal to the direct-current transmitter 4 via the input conductor pair 6$a$, 6$b$. This primary current signal can involve a standard current signal $I_{N1}$ in the range from 0 to 20 mA or 4 to 20 mA, as defined in DIN IEC 60 381 Part 1. These standard current signals can be transmitted over large distances. A measurement signal with respect to temperature can be mapped, e.g., for a temperature range from 0 to 100° C. to a standard current signal from 0 to 20 mA. A current value of 10 mA then corresponds to a temperature of 50° C. For the signal direction for measurement signals from system 1, the secondary side of the direct-current transmitter 4 is short-circuited. This means that the secondary voltage is equal to zero, so that practically no power is transmitted. The current $I_{N2}$ flowing on the secondary side is proportional to the primary current $I_{N1}$ and to the transmission ratio of the primary winding 31 to the secondary winding 32. If the number of these windings 31, 32 is equal, then the primary current $I_{N1}$ is equal to the secondary current $I_{N2}$, but the current directions are opposite each other. The signal direction and current direction thus do not match. If the direct-current transmitter 4 were to drive the second transmit-and-receive system itself, it would no longer be short-circuited, which would have the consequence that, for a power transmission that was too large, the system would leave the linear current transmission range.

For decoupling the direct-current transmitter 4 from the second transmit-and-receive system 2, the electronic I/I or I/U converter 5 is used, which is constructed as an operational amplifier arrangement. This operational amplifier arrangement 5 ensures, through its connection as an inverting amplifier, that the connection with the feedback through the control operation is led to a virtual ground, with which the two inputs P and N come to the same potential, so that the secondary-side short circuit of the direct-current transmitter 4 is guaranteed. Here, it involves a so-called virtual short circuit. The message signal transmitter 9 is here to be considered as short-circuited. Its voltage $U_2$ is equal to zero.

Figure 2:
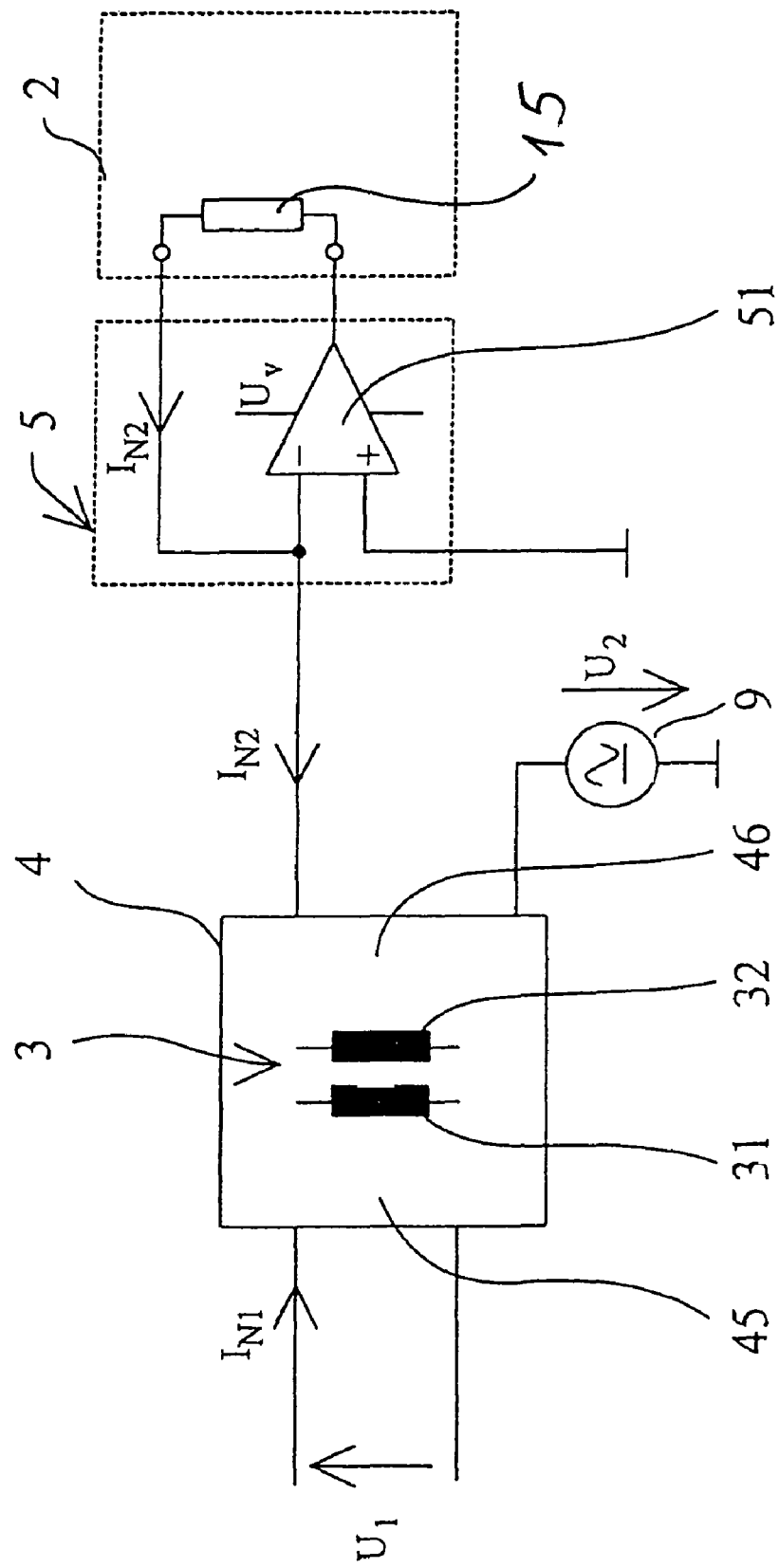

This is made clear in FIG. 2. The operational amplifier arrangement 5 comprises an operational amplifier 51 with a P-input, an N-input, and an output. The operational amplifier 51 is connected at its P-input to ground potential, and its N-input is connected to the secondary side 46 of the direct-current transmitter 4. The output is fed back via the second transmit-and-receive system 2 to the N-input. The operational amplifier 51 of the operational amplifier arrangement 5 is supplied with the voltage $U_V$. Both the terminal base of the direct-current transmitter 4 and also the P-input of the operational amplifier 51 of the operational amplifier arrangement 5 lie at the same potential, because they are both connected to ground potential. Here, the message signal transmitter 9 is also to be considered as short-circuited. In connection with the virtual short circuit of the operational amplifier 51, the direct-current transmitter 4 is short-circuited. Through the high impedance of the operational amplifier inputs, it is guaranteed that the current through the second transmit-and-receive system 2 is exactly equal to the secondary current $I_{N2}$ of the direct-current transmitter 4. The current flowing through the second transmit-and-receive system 2 is delivered from the operational amplifier 51. The operational amplifier 51 receives the energy for this current from its power supply voltage $U_V$.

To allow the transmission of a signal opposite the signal direction of the standard current signal $I_{N1}$, the message signal transmitter 9, which represents a controlled voltage source with the voltage $U_2$, is connected in series in the secondary circuit 46 of the direct-current transmitter 4. The message signal transmitter 9 as a voltage source cancels the short circuit of the direct-current transmitter 4 in the secondary circuit 46, but not the virtual short circuit of the operational amplifier 51. However, the standard current signal $I_{N1}$ can no longer flow with its original value. For this signal to continue to flow despite the voltage $U_2$ fed on the secondary side, then on the primary side the first transmit-and-receive system 1 acting as an input current source must increase its voltage $U_1$ by exactly the value corresponding to the value of the voltage $U_2$ supplied on the secondary side. Because this voltage increase is performed, the voltage $U_2$ fed on the secondary side can then be measured on the primary side 45. The signal transmission of the message signal is thus performed with the measurement of the voltage increase on the primary side.

Figure 3:
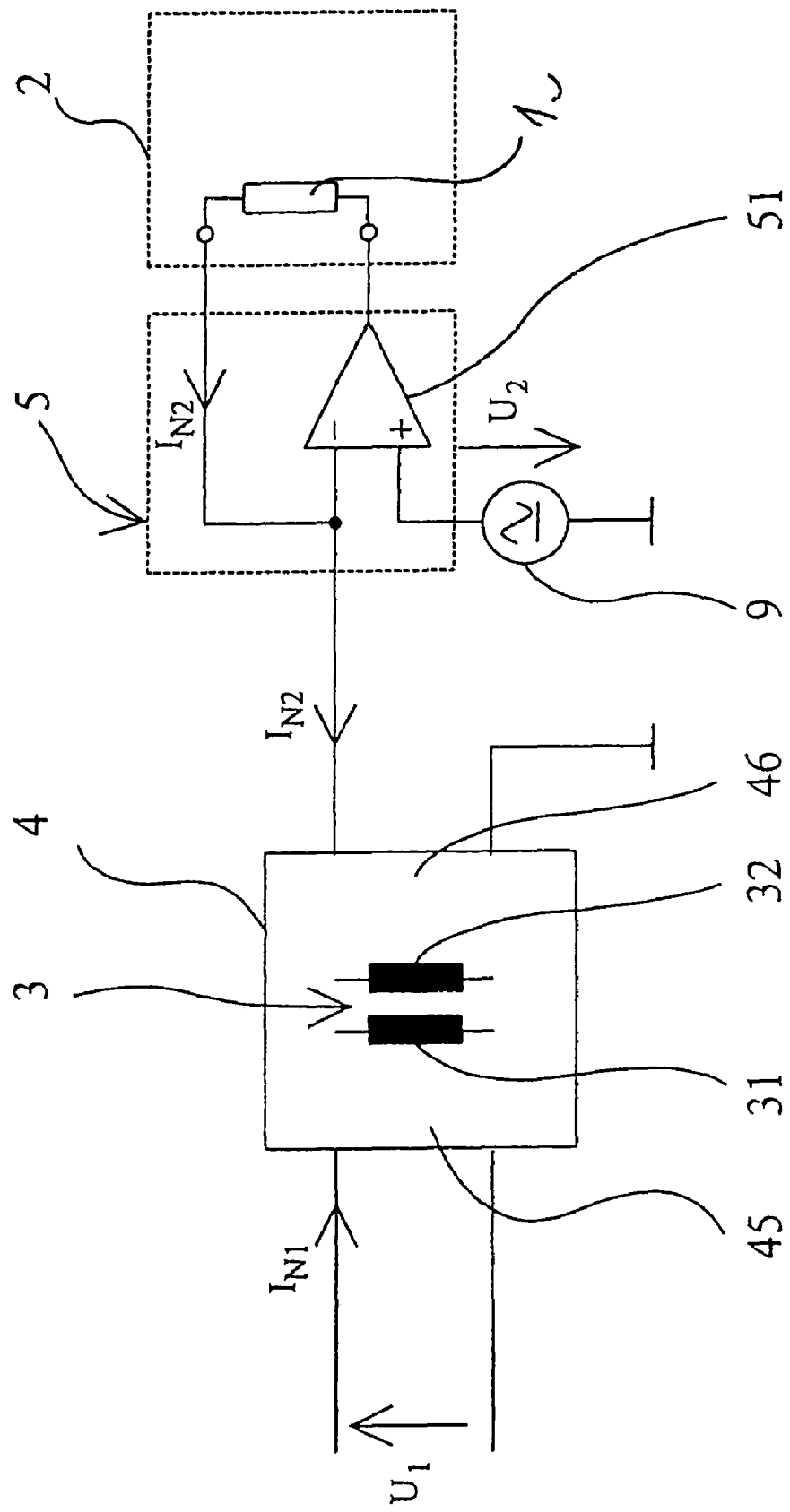

In a second embodiment, FIG. 3 shows another possibility for transmitting the voltage $U_2$ fed on the secondary side into the primary circuit 45. The controlled voltage source used as a message signal transmitter 9 is connected, in this embodiment, to the high-impedance input of the operational amplifier 51, which was the ground connection in FIG. 2. Through this activation, the secondary-side short circuit of the direct-current transmitter 4 is cancelled, because the voltage source 9 lies effectively in series with the output of the direct-current transmitter 46. Therefore, the primary voltage $U_1$ must be increased by the value of the voltage $U_2$ fed on the secondary side, so that the standard current signal $I_{N1}$ can continue to flow. In this way, the message signal can be measured on the primary side and defined in the described way.

Figure 4:
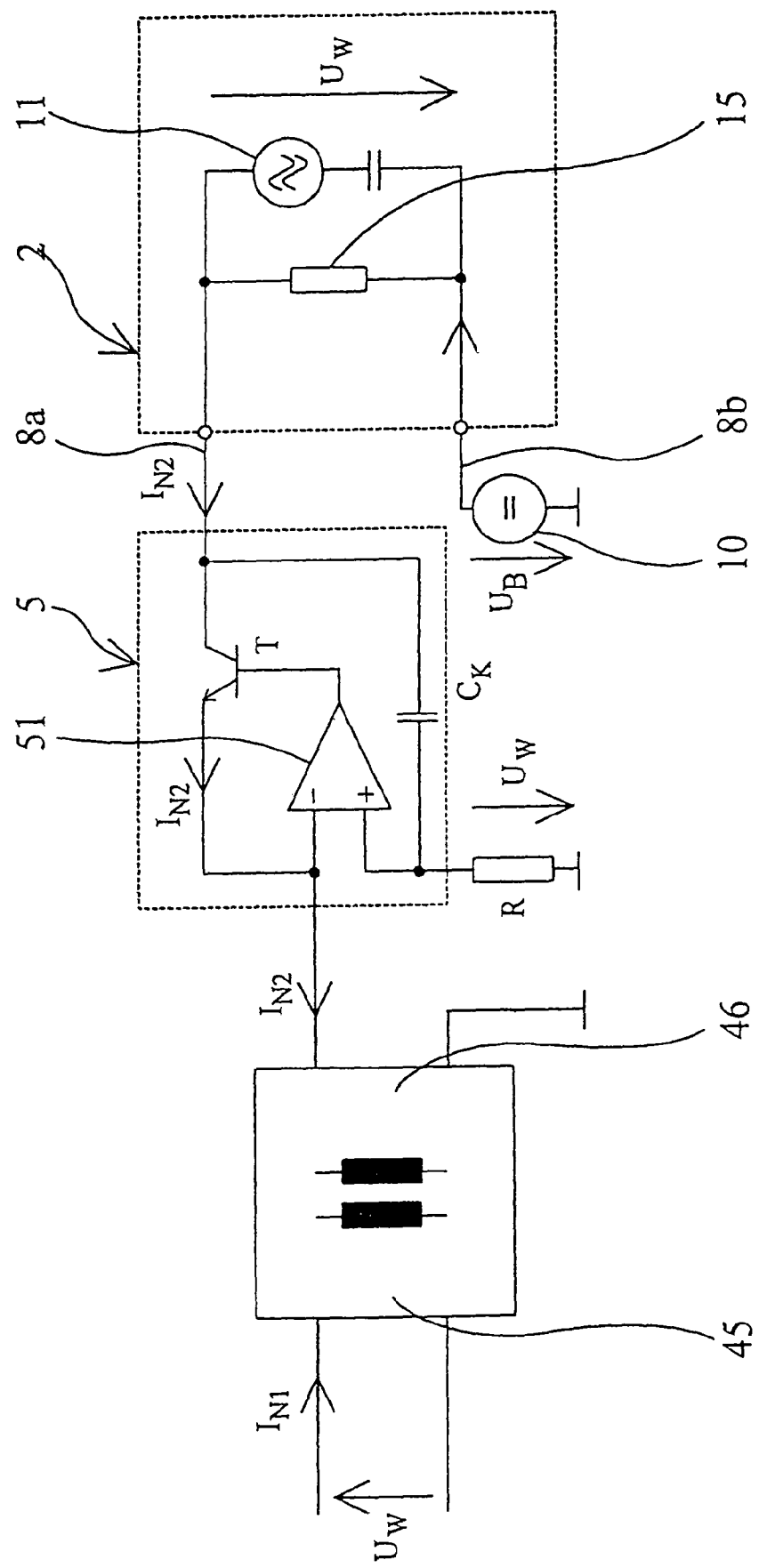

FIG. 4 shows an embodiment of the arrangement according to the invention, in which the P-input of the operational amplifier 51 of the operational amplifier 5 is connected via a resistor R to ground potential. The N-input contacts the secondary side 46 of the direct-current transmitter 4. In the output of the operational amplifier 51 there is a transistor T for amplifying the output signal of the operational amplifier 51 and for feeding this output signal back to the N-input.

Especially advantageous is this arrangement for the DC-isolated transmission of an alternating-current voltage signal $U_W$ of an alternating-current voltage signal transmitter 11 from the second transmit-and-receive system 2, which can be constructed as a field device with an apparent ohmic resistance 15. Here, the output conductor pair 8a, 8b forms the two-conductor channel running across the field. The alternating-current voltage signal $U_W$ is modulated onto the standard current signal $I_{N2}$, in order to transmit process data opposite the signal direction of the standard current signal $I_{N1}$. The alternating-current voltage signal $U_W$ is decoupled from the output conductor 8a by means of a capacitor $C_K$ and contacts the high impedance input of the operational amplifier 51, which is connected to ground, via the resistor R, under consideration that the operating voltage $U_B$ of an operating voltage source 10 for an alternating voltage is to be considered as short-circuited. Thus, the alternating voltage signal $U_W$ is in series with the output of the direct-current transmitter 4 via the virtual short circuit of the operational amplifier 51 and is transmitted to the primary side 45 of the direct-current transmitter 4 and can be measured there. The measurement is equivalent to determining the signal. Thus, a signal is transmitted indirectly from the system 2 to the system 1.

Figure 5:
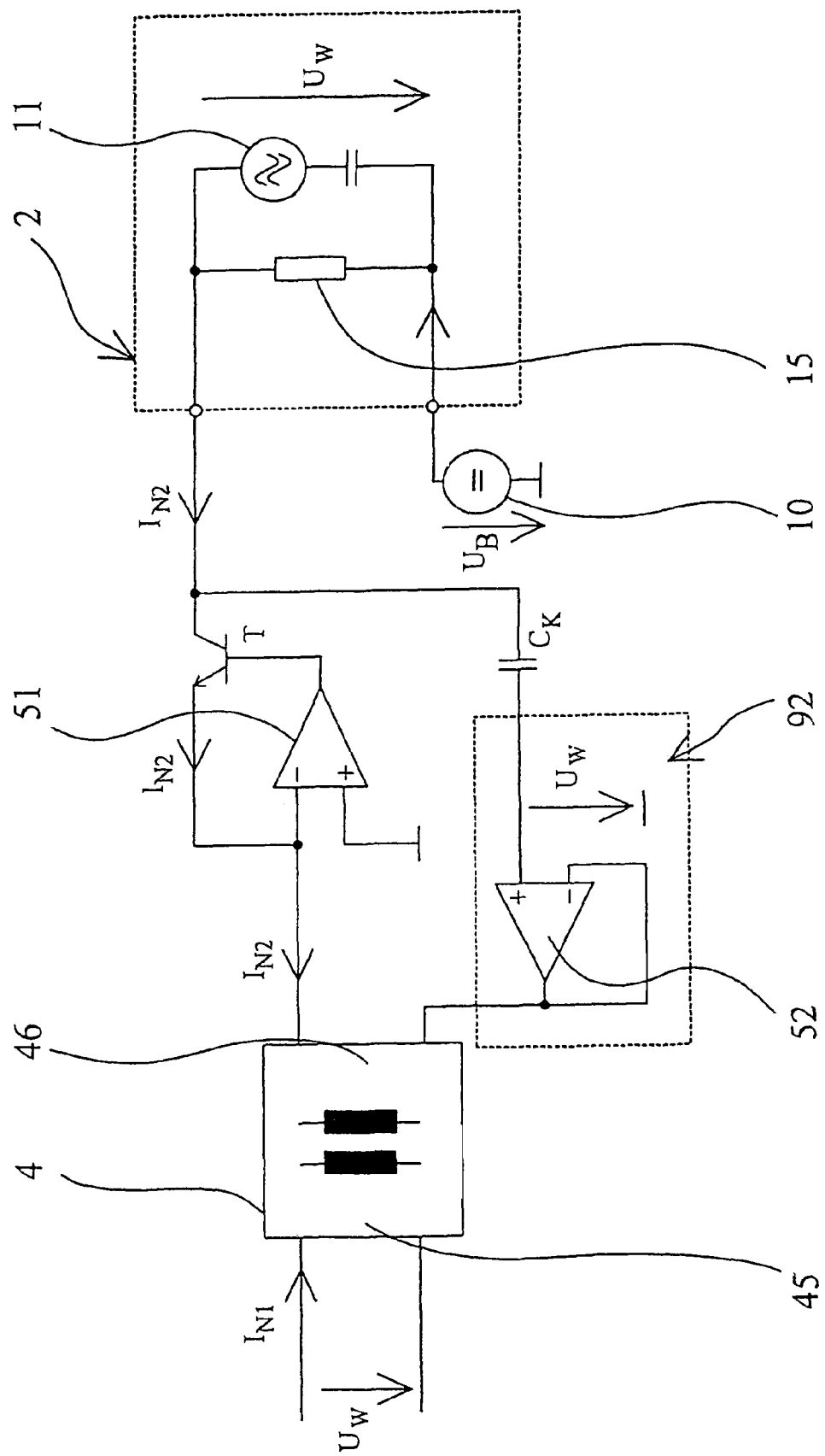

FIG. 5 shows an arrangement that is equal, in principle, to that in FIG. 4, but with the difference that the alternating-current voltage signal $U_W$ is supplied to the terminal base of the secondary circuit 46 of the direct-current transmitter 4 by means of an operational amplifier 52, which is operated as a low-impedance voltage source 92.

FIGS. 6 to 10 show various embodiments of the direct-current transmitter arrangement 4, as they are inserted into the circuit arrangement of the invention.

Figure 6:
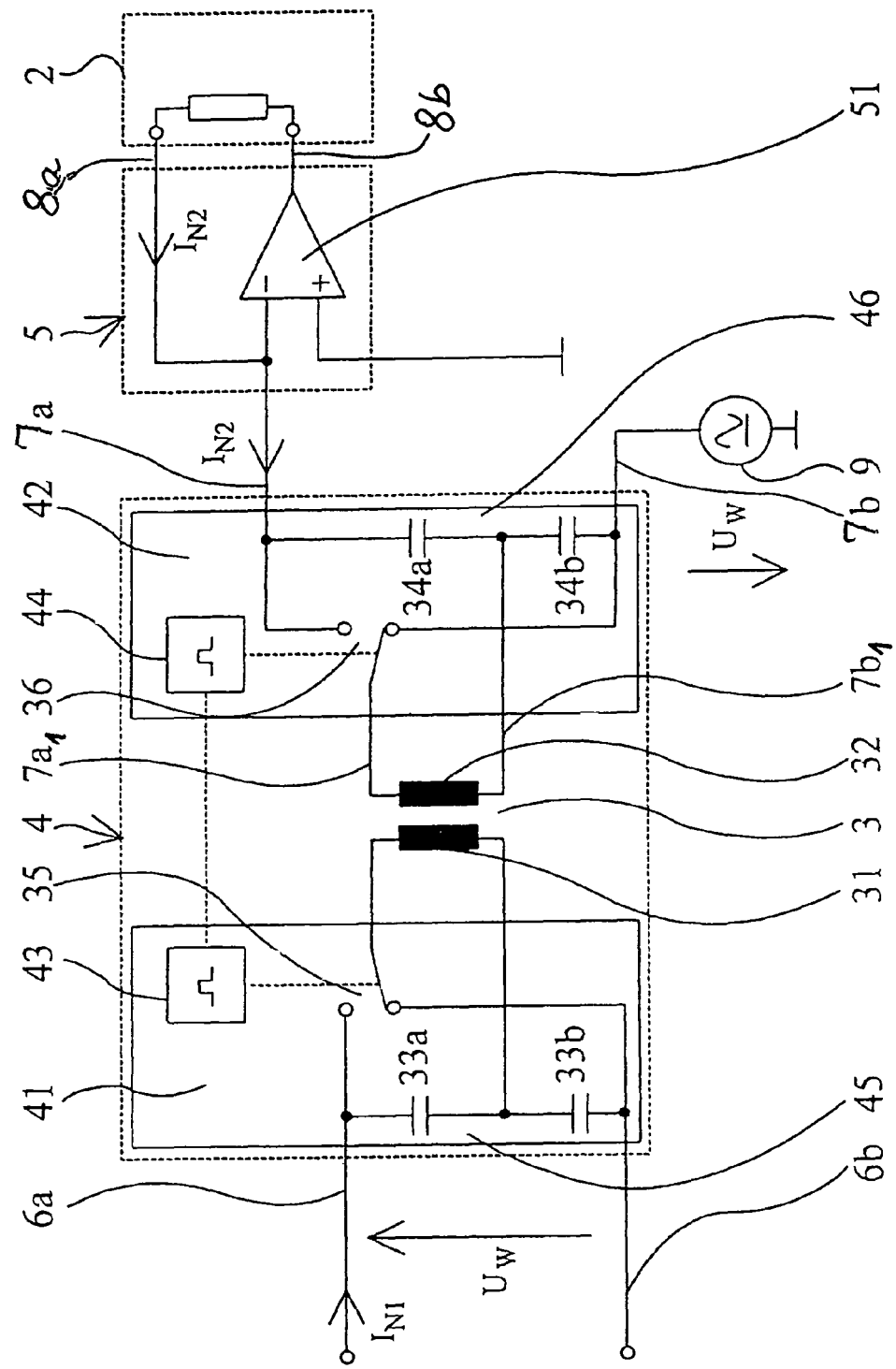

FIG. 6 shows the direct-current transmitter 4 as a half-bridge current converter with active switches 35, 36. Here, a primary-side timing generator 43 and a secondary-side timing generator 44 ensure that the primary-side switch 35 and the secondary-side circuit 36 are switched back and forth in sync between the wires of the input conductor pair 6a, 6b or the connection conductor pair 7a, 7b. The frequency of the conversion (approximately 100-200 kHz) is adapted to the inductance of the windings 31, 32 and the capacitance of the capacitors 33a, 33b, 34a, 34b. On the primary side 45, the standard current signal $I_{N1}$, which is an analog direct-current signal, changes the current direction as a function of the cycle set by the primary-side timing generator 43. For forming a suitable alternating-current signal, which can be transmitted via the isolating transformer or isolating converter 3, two capacitors 33a and 33b, which are alternately charged, are provided on the primary side 45. The same takes place on the secondary side 46 by means of two capacitors 34a and 34b and the synchronous switching of the wires of the connection conductor pair 7a, 7b to the feed lines 7a1, 7b1 of the winding 32. Thus, a standard current signal $I_{N2}$ is generated on the secondary side symmetric to the standard current signal $I_{N1}$ on the primary side, wherein the current directions are reversed.

In this embodiment of FIG. 6, the alternating-current voltage signal $U_W$ of the message signal transmitter 9 is supplied at the terminal base of the secondary side 46 of the direct-current transmitter 4.

Figure 7:
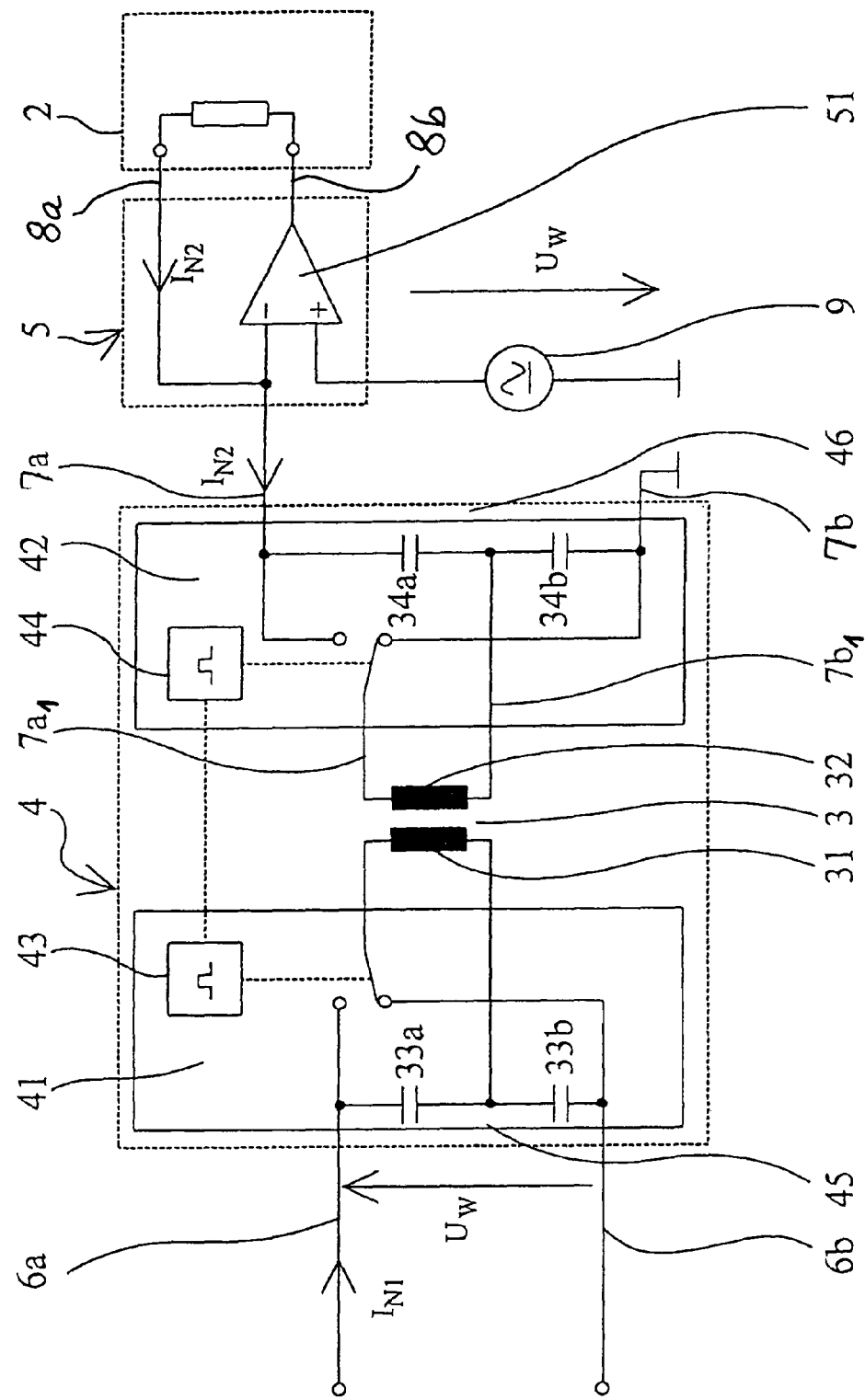

FIG. 7 shows the direct-current transmitter 4 as a half-bridge current converter with active switches in the same embodiment as in FIG. 6. The difference between FIGS. 7 and 6 is that, in FIG. 7, the supplying of the alternating-current voltage signal $U_W$ of the message signal transmitter 9 takes place at the P-input of the operational amplifier 51, as described with FIG. 3.

Figure 8:
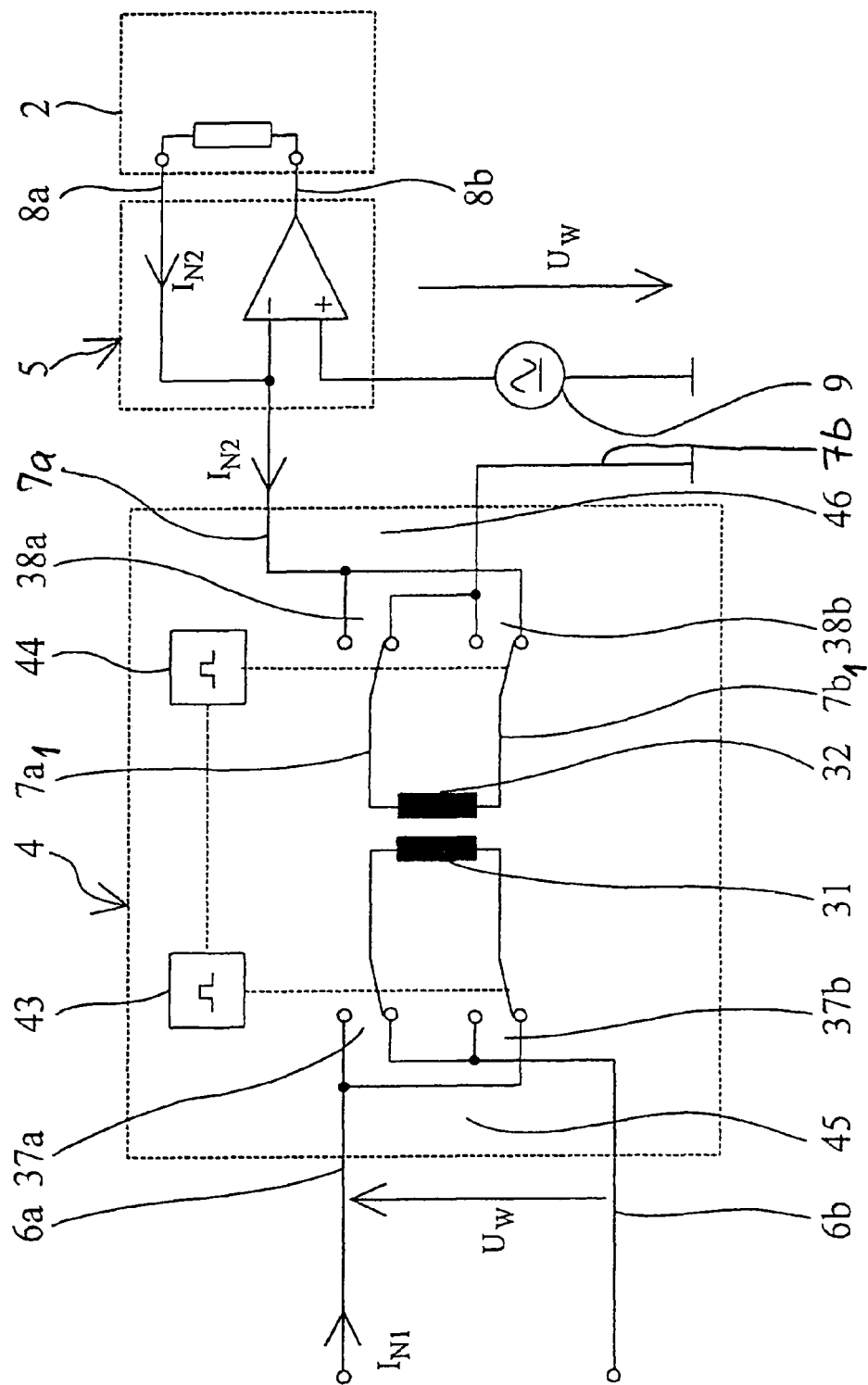

FIG. 8 shows the direct-current transmitter 4 as a full-bridge current converter with active switches 37a, 37b, 38a, 38b. In this way, a primary-side timing generator 43 switches both primary-side switches 37a and 37b between two positions for connecting the conductor wires 6a, 6b to alternating connections of the winding 31 and the conductor wires 7a, 7b to alternating connections of the winding 32. The cyclical change in position of the two primary-side switches 37a and 37b converts the incoming direct-current signal $I_{N1}$ into a pulse signal or alternating-current signal. In sync with the primary-side timing generator 43, a secondary-side timing generator 44 switches the two secondary-side switches 38a and 38b likewise between two positions. The cyclical change in position of the two secondary-side switches 38a and 38b converts the incoming pulse signal or alternating-current signal on the secondary side 46 into a direct-current signal $I_{N2}$.

Figure 9:
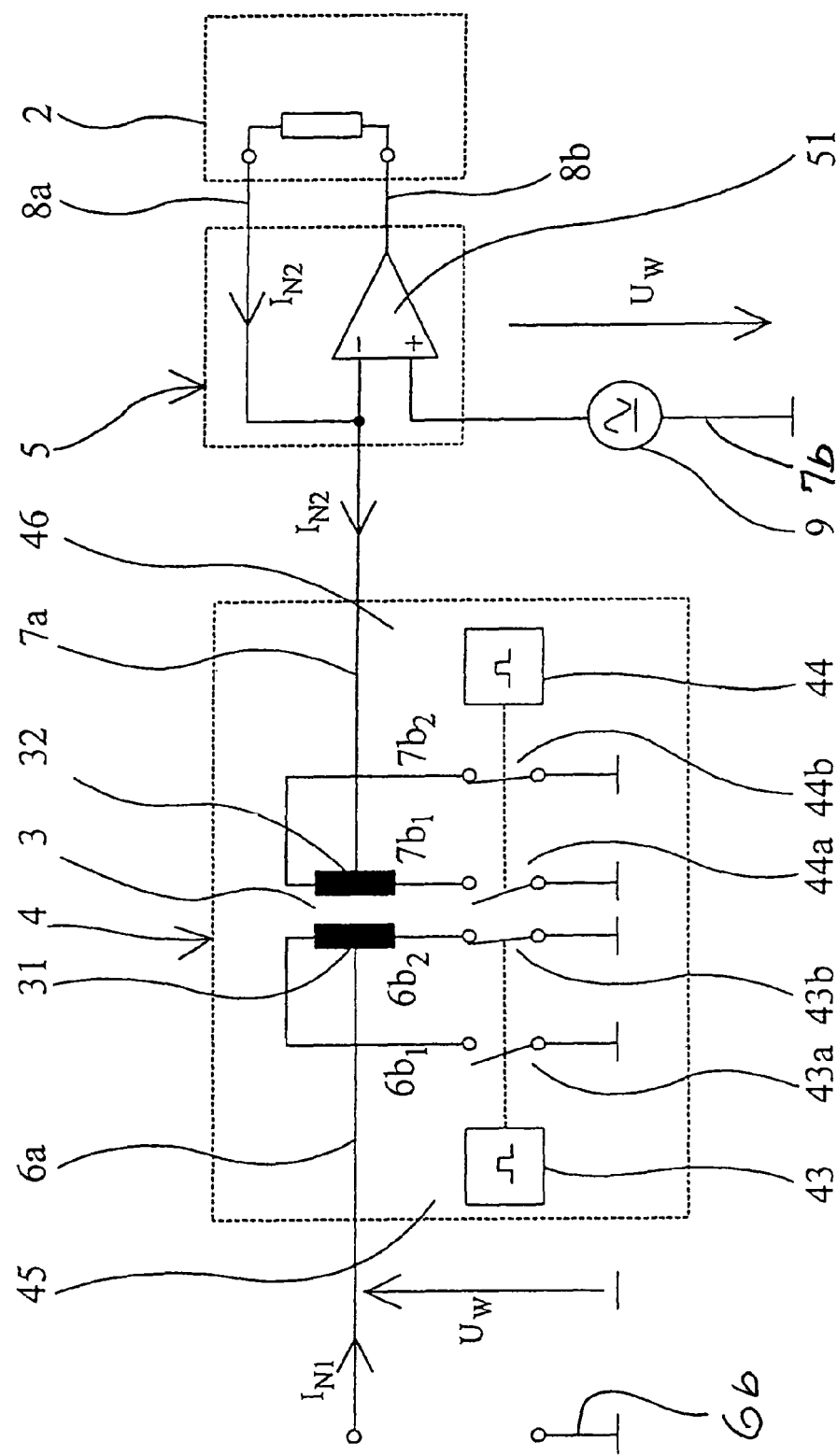

FIG. 9 shows the direct-current transmitter 4 in the construction with center tapping. Here, a primary-side timing generator 43 switches two primary-side switches 43a and 43b alternately to the connection conductors $6b_1$, and $6b_2$. The cyclical change in position of the two primary-side switches 43a and 43b converts the incoming direct-current signal $I_{N1}$ into a pulse signal or alternating-current signal. In sync with the primary-side timing generator 43, a secondary-side timing generator 44 switches two secondary-side switches 44a and 44b alternately to the connection conductors $7b_1$, and $7b_2$. The cyclical change in position of the two secondary-side switches 44a and 44b converts the incoming pulse or alternating-current signal on the secondary side 46 into a direct-current signal $I_{N2}$.

Figure 10:
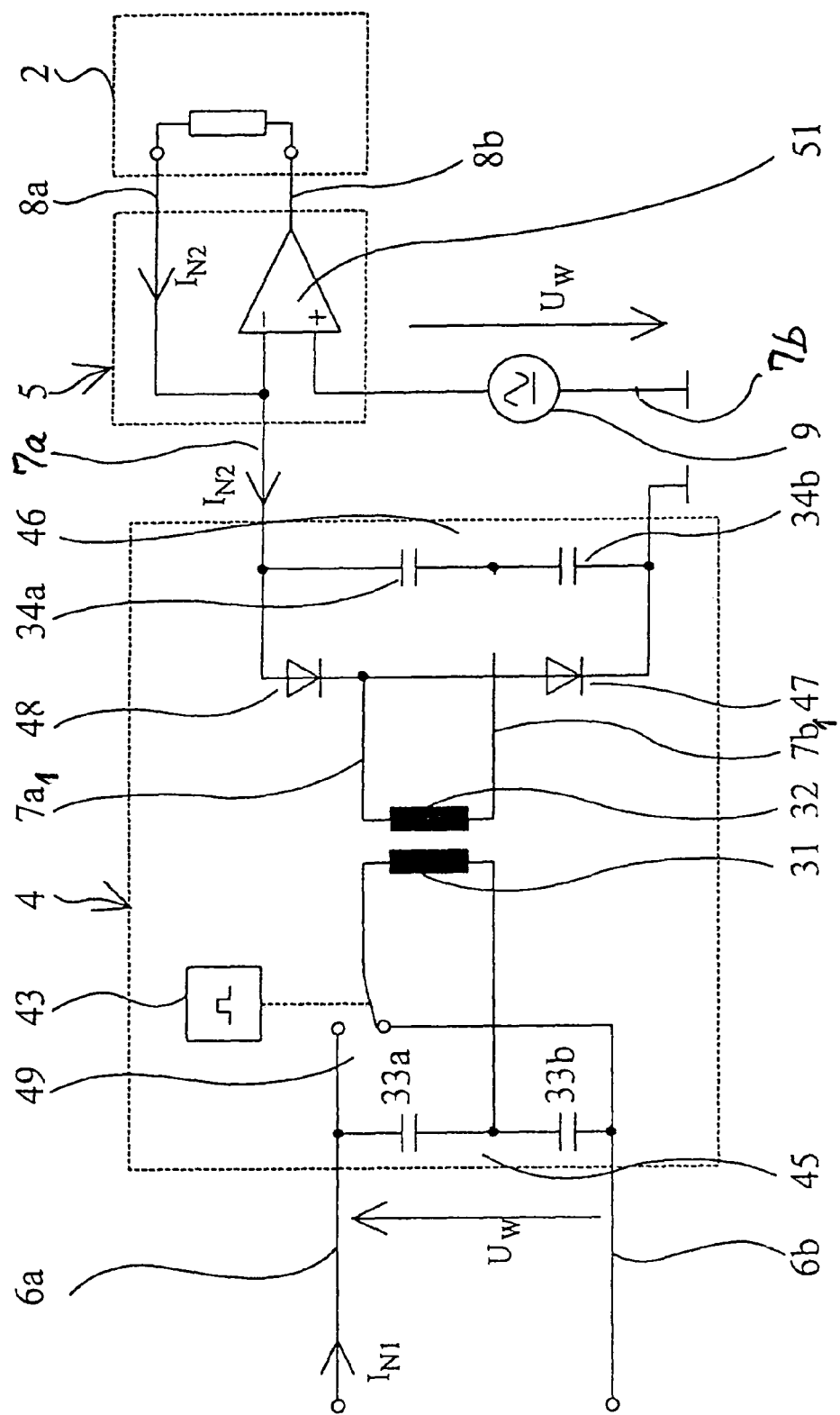

FIG. 10 shows the current converter 4 as a half-bridge current converter with diodes 47, 48. On the primary side, the direct-current signal $I_{N1}$ is converted into a pulse signal or alternating-current signal in the way already described in FIGS. 6 and 7. On the secondary side, the incoming pulse signal or alternating-current signal is converted into a direct-current signal $I_{N2}$ by means of the diodes 47 and 48 and two capacitors 34a and 34b.

One possible application for the arrangements described above consist in that the first transmit-and-receive system 1 is, for example, a memory-programmed system SPS, which generates the standard current signal $I_{N1}$. This standard current signal $I_{N1}$ has the result that, on the secondary side 46, an actuator (=apparent ohmic resistance 15 as part of a field device) changes its state. This actuator can be, e.g., a valve, which changes its state as a function of the standard current signal $I_{N1}$. By means of the return signal, the valve can report back the actual state of the valve position on the primary side 45. On the secondary side, however, complex electronics, such as, for example, a bus subscriber, could also represent the second transmit-and-receive system 2.

Another possible application for the arrangement according to the invention is that, on the primary side 45, the first transmit-and-receive system 1 includes a temperature sensor, which generates the standard current signal $I_{N1}$. The second transmit-and-receive system 2 is then, for example, an evaluation circuit. In this way, a temperature measured by the sensor can be displayed and/or used for control problems. The sensor can be parameterized by means of the return signal.

In general, the first transmit-and-receive system 1 and/or the second transmit-and-receive system 2 can be constructed as field devices, according to which the conductor section 6a,6b and/or 8a,8b represents the transmission path, which runs across the field and which can transmit signals in both directions. The direct-current transmitter 4 and the operational amplifier arrangement 5 can be considered a "central office" in this connection. This central office has only a few modules and can be housed in a small space, which is desirable.

The invention claimed is:

1. An arrangement for electrically isolated transmission of direct-current and alternating-current signals between a first transmit-and-receive system (1) and a second transmit-and-receive system (2), comprising:

sections of transmit-and-receive conductor pairs (6a, 6b; 7a, 7b; 8a, 8b), which connect the two transmit-and-receive systems (1, 2) via a single two-conductor channel; a direct-current transmitter (4) including an isolating converter (3) with a primary circuit (45) and a secondary circuit (46), which is short-circuited for the signal transmission with direct-current signals (IN1, IN2), wherein the direct-current transmitter (4) converts direct-current signals (IN1) into alternating-current signals and these back into direct-current signals (IN2) for DC isolation of the conductor sections;

an electronic I/I or I/U converter (5), on whose input side the signals transmitted via the channel are applied and on whose output side usable signals are output as current or voltage signals to the second transmit-and-receive system (2); and a message signal transmitter (9), which is connected on the secondary side to the direct-current transmitter (4) for the transmission of the message signal (U2), so that, on the primary side, a change in voltage can be determined, which can be evaluated by the first transmit-and-receive system (1) as the transmitting message signal.

2. The arrangement according to claim 1, characterized in that the message signal transmitter (9) represents a controlled voltage source in series with the secondary circuit (46) of the direct-current transmitter (4), and in that the first transmit-and-receive system (1) feeds a standard current signal (IN1) to the primary circuit (45) of the direct-current transmitter (4) and when a change in voltage appears due to a message signal, the supply voltage (U1) increases by a value corresponding to the value (U2) of the voltage of the message signal transmitter (9) supplied on the secondary side, in order to determine the value of the message signal from the measured supply voltage to the primary circuit (45).

3. The arrangement according to claim 1, characterized in that the message signal transmitter (9) is connected to a first input of an operational amplifier (51) of the electronic Nor I/U converter (5), whose other second input is connected to the secondary circuit (46) of the direct-current transmitter (4), and that the output of the operational amplifier (51) is fed back to the second input of the operational amplifier (51).

4. The arrangement according to claim 1, characterized in that the second transmit-and-receive system (2) has an alternating-current voltage signal source (11), whose alternating-current voltage signal (Uw) is modulated onto the received direct-current signal (IN2), that is, is coupled via a capacitor (CK) onto a resistor (R) in the input of the Nor I/U converter (5), wherein the alternating-current voltage signal cancels the direct ground reference of the electronic Nor I/U converter (5)

and, through its control properties, the electronic Nor I/U converter (5) modulates the alternating-current voltage signal (Uw) onto the secondary-side current (IN2) of the standard current signal (IN1) and the first transmit-and-receive system (1) is thus forced to make the same voltage available as a supply voltage (U1).

5. The arrangement according to claim 3, characterized in that the message signal transmitter (9) is formed by a low-impedance voltage source (92), which is connected, on one side, to the secondary side (46) of the direct-current transmitter (4) and, on the other side, via a capacitor (CK) to a field device with an apparent ohmic resistance (15) and an alternating-current voltage signal transmitter (11), wherein the message signal, modulated as an alternating-current voltage signal onto the secondary-side current (IN2) of the standard current signal (IN1), is transmitted to the first transmit-and-receive system (1).

6. The arrangement according to claim 1, characterized in that the connection conductors of the primary side (45) of the isolating converter (3) and the connection conductors of the secondary side (46) of the isolating converter (3) can be switched in sync for forming a half-bridge current converter.

7. The arrangement according to claim 6, characterized in that for switching in the primary circuit (45), active switches (35, 37a, 37b, 43a, 43b) and, in the secondary circuit (46), either active switches (36, 38a, 38b, 44a, 44b) or diodes (47, 48) are provided.

8. The arrangement according to claim 1, characterized in that the connection conductors of the primary side (45) of the isolating converter (3) and the connection conductors of the secondary side (46) of the isolating converter (3) can be switched in sync for forming a full-bridge current converter with active switches (37a, 37b; 38a, 38b).

9. The arrangement according to claim 1, characterized in that the isolating converter (3) is center-tapped in its primary side (45) and its secondary side (46), and that the connection conductors (6b1, 6b2; 7b1, 7b2) of the isolating converter (3) can be switched in sync.

10. A method for the electrically isolated transmission of direct-current and alternating-current signals between a first transmit-and-receive system (1) and a second transmit-and-receive system (2) the method comprising:
  a) obtaining measurement signals_in the first transmit-and-receive system (1), which measurement signals are prepared as direct-current or alternating-current signals for transmission via a two-conductor channel, which has sections that are DC-isolated from each other;
  b) feeding the direct-current and alternating-current signals to an electronic I/I or I/U converter (5) via the two-conductor channel under use of a direct- current transmitter (4) with the isolating converter (3);
  c) recovering, at the electronic Nor I/U converter (5), a current or voltage signal corresponding to the measurement signal from the direct-current and alternating-current signals and making the current or voltage signal available to the second transmit-and-receive system (2); and
  d) in the case of the transmission of a message signal to the first transmit-and-receive system (1) from the second transmit-and-receive system (2), feeding the message signal to the secondary circuit (46) of the direct-current transmitter (4) and supplying the message signal via the primary circuit (45) to the first transmit-and-receive system (1).

11. The method according to claim 10, characterized in that the measurement signals represent direct-current signals of a measurement signal transmitter and are chopped for transmission via the isolating converter (3).

12. The method according to claim 11, characterized in that the direct-current measurement signals represent standard signals (IN1) each with set current intensities.

13. The method according to claim 10, characterized in that the message signals represent voltage signals (U2), which are supplied on the secondary side (46) and which can be detected on the primary side (45) through compensation of the change in voltage on the primary side (45).

14. The method according to claim 10, characterized in that the first transmit-and-receive system (1) represents a memory-programmable system and that the second transmit-and-receive system (2) includes a controlled device, which reacts due to the measurement signal and which optionally triggers the return transmission of a message signal.

15. The method according to claim 14, characterized in that the controlled device represents an actuator, which changes its state or its position as a function of the measurement signal.

16. The method according to claim 14, characterized in that the controlled device represents a bus subscriber.

17. The method according to claim 14, characterized in that the controlled device represents an evaluation circuit.

18. The method according to claim 10, characterized in that the first transmit-and-receive system (1) represents a sensor device.

* * * * *